United States Patent
Schuler et al.

(10) Patent No.: US 10,251,425 B2
(45) Date of Patent: Apr. 9, 2019

(54) VAPORIZING DEVICE WITH POWER COMPONENT

(71) Applicant: NJOY, LLC, Scottsdale, AZ (US)

(72) Inventors: David Schuler, Scottsdale, AZ (US); Ryan Miller, Scottsdale, AZ (US); William E. Allenfort, Phoenix, AZ (US); Jonathon Davenport, Las Vegas, NV (US); Mark Scatterday, Scottsdale, AZ (US)

(73) Assignee: NJOY, LLC, Scottsdale, AZ (US)

( * ) Notice: Subject to any disclaimer, the term of this patent is extended or adjusted under 35 U.S.C. 154(b) by 0 days.

(21) Appl. No.: 15/203,334

(22) Filed: Jul. 6, 2016

(65) Prior Publication Data

US 2017/0367406 A1 Dec. 28, 2017
US 2018/0192698 A9 Jul. 12, 2018

Related U.S. Application Data

(60) Provisional application No. 62/189,085, filed on Jul. 6, 2015, provisional application No. 62/189,032, filed on Jul. 6, 2015.

(51) Int. Cl.
*A24F 47/00* (2006.01)
*H01M 2/10* (2006.01)
*H01R 13/207* (2006.01)

(52) U.S. Cl.
CPC ......... *A24F 47/008* (2013.01); *H01M 2/1022* (2013.01); *H01M 2/1055* (2013.01); *H01M 2220/30* (2013.01); *H01R 13/207* (2013.01)

(58) Field of Classification Search
CPC .................................................. A24F 47/008
See application file for complete search history.

(56) References Cited

U.S. PATENT DOCUMENTS

| 374,584 A | 12/1887 | Cook |
| 576,653 A | 2/1897 | Bowlby |

(Continued)

FOREIGN PATENT DOCUMENTS

| CN | 201290340 Y | 8/2009 |
| CN | 101869356 A | 10/2010 |

(Continued)

OTHER PUBLICATIONS eCig Dab Vape on DHGate, dated 2016, http://www.dhgate.com/product/ecig-dab-vape-attachment-dabbing-kt-evod/269388312.html.

*Primary Examiner* — Tho D Ta
*Assistant Examiner* — Marcus E Harcum
(74) *Attorney, Agent, or Firm* — Bookoff McAndrews, PLLC (57) ABSTRACT

A vaporizing device generally having a tank, power component, battery, and shroud is disclosed. The power component may include a frame defining a slot configured to receive the tank in an upright position, such that a portion of the tank is adjacent to the power component when the tank is in position. The battery may be coupled to the frame of the power component. The shroud may be configured to be positioned around the battery and coupled to the frame. The battery may be activated when the shroud is compressed radially inward. The device may include a port for connection to an external power supply for recharging the battery. The device may be portable with a generally compact configuration in order to allow a user to comfortably hold the device in the palm of the hand.

19 Claims, 10 Drawing Sheets

(56) References Cited

U.S. PATENT DOCUMENTS

| | | | |
|---|---|---|---|
| 595,070 A | 12/1897 | Oldenbusch | |
| 799,844 A | 9/1905 | Fuller | |
| 969,076 A | 8/1910 | Pender | |
| 1,067,531 A | 7/1913 | MacGregor | |
| 1,163,183 A | 12/1915 | Stoll | |
| 1,299,162 A | 4/1919 | Fisher | |
| 1,505,748 A | 3/1924 | Tamis | |
| 1,552,877 A | 9/1925 | Phillipps et al. | |
| 1,632,335 A | 6/1927 | Hiering | |
| 1,706,244 A | 3/1929 | Meyerson | |
| 1,845,340 A | 2/1932 | Ritz | |
| 1,972,118 A | 9/1934 | McDill | |
| 1,998,683 A | 4/1935 | Montgomery | |
| 2,031,363 A | 2/1936 | Erikson | |
| 2,039,559 A | 5/1936 | Segal | |
| D107,794 S | 1/1938 | Rathbun | |
| 2,327,120 A | 11/1940 | McCoon | |
| 2,231,909 A | 2/1941 | Hempel | |
| 2,460,427 A | 2/1949 | Musselman et al. | |
| 2,483,304 A | 9/1949 | Vogel | |
| 2,502,561 A | 4/1950 | Ebert | |
| 2,765,949 A | 10/1956 | Hillman | |
| 2,897,958 A | 8/1959 | Tarleton | |
| 3,146,937 A | 9/1964 | Vesak | |
| D207,179 S | 3/1967 | Kanamaru | |
| 3,420,360 A | 1/1969 | Young | |
| 3,567,014 A | 3/1971 | Feigelman | |
| 3,743,136 A | 7/1973 | Chambers | |
| 3,861,523 A | 1/1975 | Fountain et al. | |
| 3,941,300 A | 3/1976 | Troth | |
| D244,355 S | 5/1977 | Mazie et al. | |
| D244,784 S | 6/1977 | O'Brien | |
| D251,360 S | 3/1979 | Collin | |
| 4,207,976 A | 6/1980 | Herman | |
| D269,068 S | 5/1983 | Mann et al. | |
| 4,460,105 A | 7/1984 | Cox | |
| 4,519,319 A | 5/1985 | Howlett | |
| 4,771,796 A | 9/1988 | Myer | |
| 4,798,310 A | 1/1989 | Kasai et al. | |
| 4,813,536 A | 3/1989 | Willis | |
| 4,848,375 A | 7/1989 | Patron et al. | |
| 4,848,563 A | 7/1989 | Robbins | |
| 4,922,901 A * | 5/1990 | Brooks | A24F 47/006 128/202.27 |
| 5,005,759 A | 4/1991 | Bouche | |
| 5,123,530 A | 6/1992 | Lee | |
| 5,269,327 A | 12/1993 | Counts et al. | |
| 5,465,738 A | 11/1995 | Rowland | |
| 5,566,855 A | 10/1996 | Bradach | |
| 5,605,226 A | 2/1997 | Hernlein | |
| D379,248 S | 5/1997 | Khemarangsan | |
| 5,641,064 A | 6/1997 | Goserud | |
| 5,687,745 A | 11/1997 | Valcin | |
| 5,746,587 A | 5/1998 | Racine et al. | |
| 5,810,164 A | 9/1998 | Rennecamp | |
| 5,881,884 A | 3/1999 | Podosek | |
| 5,938,018 A | 8/1999 | Keaveney et al. | |
| 5,967,310 A | 10/1999 | Hill | |
| 5,975,415 A | 11/1999 | Zehnal | |
| 5,979,460 A | 11/1999 | Matsumura | |
| 6,050,420 A | 4/2000 | Green | |
| 6,125,082 A | 9/2000 | Reid | |
| 6,155,268 A * | 12/2000 | Takeuchi | A24F 47/008 131/194 |
| D441,494 S | 5/2001 | Chen | |
| 6,269,966 B1 | 8/2001 | Pallo et al. | |
| 6,386,371 B1 | 5/2002 | Parsons | |
| 6,431,363 B1 | 8/2002 | Hacker | |
| 6,446,793 B1 | 9/2002 | Layshock | |
| 6,474,342 B1 | 11/2002 | Rennecamp | |
| 6,510,982 B2 | 1/2003 | White et al. | |
| D472,463 S | 4/2003 | Kinigakis | |
| 6,557,708 B2 | 5/2003 | Polacco | |
| 6,622,867 B2 | 9/2003 | Menceles | |
| 6,637,430 B1 * | 10/2003 | Voges | A61M 15/0065 128/200.14 |
| D485,639 S | 1/2004 | Stronski | |
| 6,672,762 B1 | 1/2004 | Faircloth | |
| 6,726,006 B1 | 4/2004 | Funderburk et al. | |
| D498,877 S | 11/2004 | Sher | |
| 7,000,775 B2 | 2/2006 | Gelardi | |
| D528,411 S | 9/2006 | Nehus et al. | |
| D548,592 S | 8/2007 | Kudo et al. | |
| 7,374,048 B2 | 5/2008 | Mazurek | |
| D575,149 S | 8/2008 | Baranowski | |
| 7,546,703 B2 | 6/2009 | Johnske et al. | |
| 7,621,403 B2 | 11/2009 | Althoff et al. | |
| 7,644,823 B2 | 1/2010 | Gelardi et al. | |
| D613,171 S | 4/2010 | Sempe | |
| D625,466 S | 10/2010 | Martin | |
| 7,815,332 B1 | 10/2010 | Smith | |
| 7,886,507 B2 | 2/2011 | McGuinness, Jr. | |
| D644,375 S | 8/2011 | Zhou | |
| 7,988,034 B2 | 8/2011 | Pezzoli | |
| 8,141,701 B2 | 3/2012 | Hodges | |
| 8,314,591 B2 | 11/2012 | Terry et al. | |
| 8,443,534 B2 | 5/2013 | Goodfellow et al. | |
| D683,898 S | 6/2013 | Liu | |
| 8,464,867 B2 | 6/2013 | Holloway et al. | |
| D690,461 S | 9/2013 | Chen | |
| 8,539,959 B1 | 9/2013 | Scatterday | |
| D693,053 S | 11/2013 | Chen | |
| D694,468 S | 11/2013 | Chen | |
| 8,596,460 B2 | 12/2013 | Scatterday | |
| D700,070 S | 2/2014 | Markovic | |
| 8,689,805 B2 | 4/2014 | Hon | |
| 8,794,434 B2 | 8/2014 | Scatterday et al. | |
| 8,833,364 B2 | 9/2014 | Buchberger | |
| D720,881 S | 1/2015 | Liu | |
| D721,577 S | 1/2015 | Scatterday | |
| D723,216 S | 2/2015 | Chen | |
| D724,782 S | 3/2015 | Wu | |
| D725,823 S | 3/2015 | Scatterday et al. | |
| D728,155 S | 4/2015 | Liu | |
| 9,010,335 B1 | 4/2015 | Scatterday | |
| D729,441 S | 5/2015 | Hua | |
| 9,089,166 B1 | 7/2015 | Scatterday | |
| D759,297 S | 6/2016 | Liu | |
| 9,635,887 B2 * | 5/2017 | Ivey | A61L 9/122 |
| D809,190 S | 1/2018 | Schuler et al. | |
| 9,913,493 B2 * | 3/2018 | Worm | A61M 15/06 |
| 10,039,323 B2 | 8/2018 | Schuler et al. | |
| 2001/0032795 A1 | 10/2001 | Weinstein et al. | |
| 2001/0052480 A1 | 12/2001 | Kawaguchi et al. | |
| 2002/0043554 A1 | 4/2002 | White et al. | |
| 2002/0175164 A1 | 11/2002 | Dees et al. | |
| 2003/0063523 A1 | 4/2003 | Mulaw | |
| 2003/0089377 A1 | 5/2003 | Hajaligol et al. | |
| 2004/0149624 A1 | 8/2004 | Wischusen, III et al. | |
| 2004/0216753 A1 | 11/2004 | Fox | |
| 2005/0016550 A1 | 1/2005 | Katase | |
| 2005/0061759 A1 | 3/2005 | Doucette | |
| 2005/0118545 A1 | 6/2005 | Wong | |
| 2005/0145533 A1 | 7/2005 | Seligson | |
| 2005/0172976 A1 | 8/2005 | Newman et al. | |
| 2005/0236282 A1 | 10/2005 | Huska | |
| 2006/0054676 A1 | 3/2006 | Wischusen, III | |
| 2006/0150991 A1 | 7/2006 | Lee | |
| 2006/0254948 A1 | 11/2006 | Herbert et al. | |
| 2006/0255105 A1 | 11/2006 | Sweet | |
| 2007/0062548 A1 | 3/2007 | Horstmann et al. | |
| 2007/0098148 A1 | 5/2007 | Sherman | |
| 2007/0235046 A1 | 10/2007 | Gedevanishvili | |
| 2007/0267033 A1 | 11/2007 | Mishra et al. | |
| 2008/0092912 A1 | 4/2008 | Robinson et al. | |
| 2008/0241255 A1 | 10/2008 | Rose et al. | |
| 2008/0276947 A1 | 11/2008 | Martzel | |
| 2009/0095311 A1 | 4/2009 | Han | |
| 2009/0267252 A1 | 10/2009 | Ikeyama | |
| 2009/0288669 A1 | 11/2009 | Hutchens | |
| 2010/0000672 A1 | 1/2010 | Fogle | |
| 2010/0031968 A1 | 2/2010 | Sheikh et al. | |
| 2010/0186757 A1 | 7/2010 | Crooks et al. | |

(56) References Cited

U.S. PATENT DOCUMENTS

| | | |
|---|---|---|
| 2010/0200006 A1 | 8/2010 | Robinson et al. |
| 2010/0242974 A1 | 9/2010 | Pan |
| 2010/0275938 A1 | 11/2010 | Roth et al. |
| 2010/0276333 A1 | 11/2010 | Couture |
| 2010/0307116 A1 | 12/2010 | Fisher |
| 2010/0313901 A1* | 12/2010 | Fernando ............... A24F 47/008 131/330 |
| 2011/0036346 A1 | 2/2011 | Cohen |
| 2011/0049226 A1 | 3/2011 | Moreau et al. |
| 2011/0155153 A1 | 6/2011 | Thorens et al. |
| 2011/0180433 A1 | 6/2011 | Rennecamp |
| 2011/0162667 A1 | 7/2011 | Burke et al. |
| 2011/0168194 A1 | 7/2011 | Hon |
| 2011/0232654 A1 | 9/2011 | Mass |
| 2011/0240494 A1 | 10/2011 | Vecchi |
| 2011/0265806 A1 | 11/2011 | Alarcon et al. |
| 2011/0277780 A1 | 11/2011 | Terry et al. |
| 2011/0278189 A1 | 11/2011 | Terry et al. |
| 2011/0315701 A1 | 12/2011 | Everson |
| 2012/0060853 A1 | 3/2012 | Robinson et al. |
| 2012/0111347 A1 | 5/2012 | Hon |
| 2012/0204889 A1 | 8/2012 | Xiu |
| 2012/0227753 A1 | 9/2012 | Newton |
| 2012/0230659 A1 | 9/2012 | Goodman |
| 2012/0261286 A1 | 10/2012 | Holloway et al. |
| 2012/0267383 A1 | 10/2012 | Van Rooyen |
| 2013/0081642 A1 | 4/2013 | Safari |
| 2013/0087160 A1 | 4/2013 | Gherghe |
| 2013/0140200 A1 | 6/2013 | Scatterday |
| 2013/0228191 A1 | 9/2013 | Newton |
| 2013/0247924 A1 | 9/2013 | Scatterday et al. |
| 2013/0248385 A1 | 9/2013 | Scatterday et al. |
| 2013/0263869 A1 | 10/2013 | Zhu |
| 2013/0276802 A1 | 10/2013 | Scatterday |
| 2013/0284190 A1 | 10/2013 | Scatterday et al. |
| 2013/0284191 A1 | 10/2013 | Scatterday et al. |
| 2013/0298905 A1 | 11/2013 | Levin |
| 2013/0306065 A1 | 11/2013 | Thorens |
| 2013/0313139 A1 | 11/2013 | Scatterday et al. |
| 2013/0333711 A1 | 12/2013 | Liu |
| 2013/0341218 A1 | 12/2013 | Liu |
| 2014/0014124 A1 | 1/2014 | Glasberg et al. |
| 2014/0053858 A1 | 2/2014 | Liu |
| 2014/0123989 A1* | 5/2014 | LaMothe ............... A24F 47/008 131/328 |
| 2014/0182610 A1 | 7/2014 | Liu |
| 2014/0190496 A1 | 7/2014 | Wensley |
| 2014/0196716 A1 | 7/2014 | Liu |
| 2014/0196731 A1 | 7/2014 | Scatterday |
| 2014/0261495 A1 | 9/2014 | Novak, III |
| 2014/0345635 A1 | 11/2014 | Rabinowitz et al. |
| 2014/0353856 A1 | 12/2014 | Dubief |
| 2014/0374289 A1 | 12/2014 | Liu |
| 2015/0053217 A1* | 2/2015 | Steingraber ............ A24F 47/008 131/329 |
| 2015/0059784 A1 | 3/2015 | Liu |
| 2015/0090253 A1 | 4/2015 | Farrow |
| 2015/0101945 A1 | 4/2015 | Scatterday |
| 2015/0114406 A1 | 4/2015 | Newton |
| 2015/0181944 A1 | 7/2015 | Li et al. |
| 2015/0189918 A1* | 7/2015 | Liu ........................ A24F 47/008 131/329 |
| 2015/0208725 A1* | 7/2015 | Tsai ...................... A24F 47/008 392/390 |
| 2015/0245661 A1* | 9/2015 | Milin .................... A24F 47/008 131/329 |
| 2015/0282530 A1* | 10/2015 | Johnson ................ A24F 47/008 392/387 |
| 2015/0305406 A1* | 10/2015 | Li .......................... A24F 47/008 131/329 |
| 2015/0335073 A1 | 11/2015 | Li |
| 2016/0000145 A1 | 1/2016 | Liu |
| 2016/0113327 A1 | 4/2016 | Wu |
| 2016/0120218 A1* | 5/2016 | Schennum ............... A24F 15/12 206/266 |
| 2016/0135505 A1 | 5/2016 | Li |
| 2017/0049152 A1* | 2/2017 | Liu ........................ A24F 47/008 |
| 2017/0214261 A1* | 7/2017 | Gratton ................ H02J 7/0044 |
| 2017/0238617 A1* | 8/2017 | Scatterday ............ A24F 47/008 |
| 2017/0367407 A1* | 12/2017 | Althorpe ................ A24F 47/008 |

FOREIGN PATENT DOCUMENTS

| | | |
|---|---|---|
| CN | 202122096 U | 1/2012 |
| CN | 203318894 U | 12/2013 |
| CN | 203435686 U | 2/2014 |
| CN | 203492785 U | 3/2014 |
| EP | 2186537 A1 | 5/2010 |
| EP | 2253233 A1 | 11/2010 |
| EP | 2325093 A1 | 5/2011 |
| JP | 2001-165437 A | 6/2001 |
| WO | WO-2011/033396 A1 | 3/2011 |
| WO | WO-2011/117580 A2 | 9/2011 |
| WO | WO-2012/021972 A1 | 2/2012 |
| WO | WO 2012/109371 A1 | 8/2012 |
| WO | WO 2013/141906 A1 | 9/2013 |
| WO | WO 2013/141907 A1 | 9/2013 |
| WO | WO 2013/141994 A1 | 9/2013 |
| WO | WO 2013/141998 A2 | 9/2013 |
| WO | WO 2013/142671 A1 | 9/2013 |
| WO | WO 2013/142678 A1 | 9/2013 |
| WO | WO 2014/113592 A1 | 7/2014 |

* cited by examiner

VAPORIZING DEVICE WITH POWER COMPONENT

RELATED APPLICATIONS

This application claims the benefit of priority from U.S. Provisional Application No. 62/189,032, titled VAPORIZING DEVICE WITH POWER COMPONENT, filed on Jul. 6, 2015, which is hereby incorporated by reference herein in its entirety; and U.S. Provisional Application No. 62/189,085, titled VAPORIZING DEVICE WITH POWER COMPONENT, filed on Jul. 6, 2015.

TECHNICAL FIELD

The present application relates generally to vaporizing devices and components thereof, e.g., batteries and tanks for containing e-liquid for vaporization and, more particularly, to a vaporizing device that may be portable with a generally compact configuration, e.g., to allow a user to comfortably hold the device in the palm of the hand.

BACKGROUND

Many current vaporizing devices have a wand- or pen-like shape. Often these devices are intended to be carried in a case, which may be bulky and too big to carry in a pocket. Or the device itself may be too bulky to be conveniently carried. In addition, some devices must be taken apart for transport between uses, e.g., in a cigarette case.

The present application addresses these problems encountered in prior art vaporizing devices and provides other, related advantages.

SUMMARY

In accordance with one embodiment of the present application, a vaporizing device is disclosed. The vaporizing device comprises, in combination: a tank having a mouthpiece for insertion into a user's mouth; and a power component comprising: a frame, wherein a portion of the frame defines a slot configured to receive the tank in an upright position; a battery configured to be attached to the frame; and a shroud configured to be positioned around the battery and coupled to the frame; wherein at least a portion of the tank is adjacent to the power component when the tank is positioned in the slot.

In accordance with another embodiment of the present application, a vaporizing device is disclosed. The vaporizing device comprises, in combination: a tank having a mouthpiece for insertion into a user's mouth; and a power component comprising: a frame, wherein a portion of the frame having a tapered surface defines a slot configured to receive the tank in an upright position, wherein a top of the slot is tapered to expose at least a portion of a length of the tank; an electrical connector positioned in the slot and configured to be connected to the tank; a battery configured to be attached to the frame; and a shroud configured to be positioned around the battery and coupled to the frame; wherein at least a portion of the tank is adjacent to the power component when the tank is positioned in the slot.

In accordance with yet another embodiment of the present application, a vaporizing device is disclosed. The vaporizing device comprises, in combination: a tank having a mouthpiece for insertion into a user's mouth; and a power component having a generally ergonomic shape configured to fit in a palm of the user's hand comprising: a frame, wherein an upper portion of the frame having a tapered surface defines a slot configured to receive the tank in an upright position, wherein a top of the slot is tapered to expose at least a portion of a length of the tank, and wherein a portion of the tank from the mouthpiece to a lower area of the tank is visible when the tank is disposed in the slot; an electrical connector positioned in the slot and configured to be connected to the tank; a base portion having a charging port; a battery configured to be attached to the frame; and a shroud configured to be positioned around the battery and removably coupled to the frame; wherein at least a portion of the tank is adjacent to the power component when the tank is positioned in the slot.

BRIEF DESCRIPTION OF THE DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
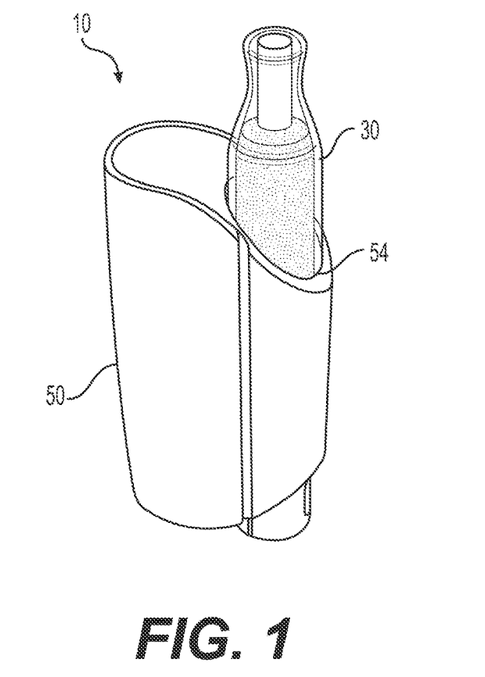
FIG. 1 is a perspective view of a vaporizing device, consistent with an embodiment of the present application.
Figure 2:
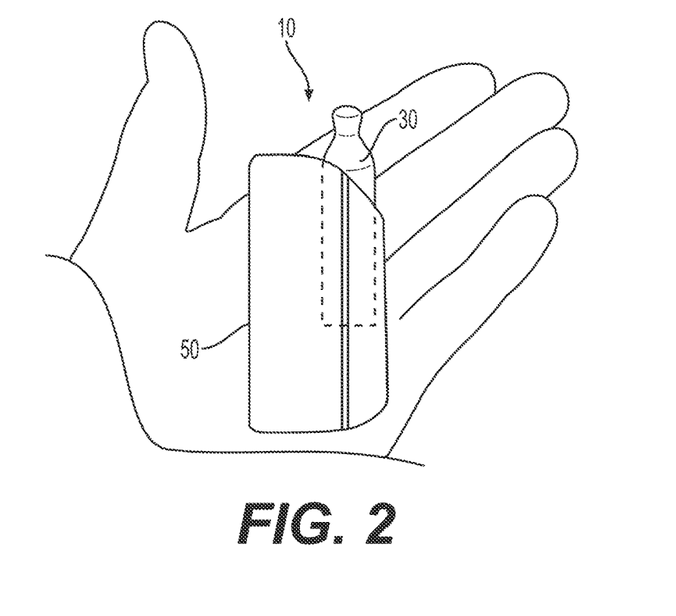
FIG. 2 depicts a vaporizing device, consistent with an embodiment of the present application, being held in a palm of a user.
Figure 3A:
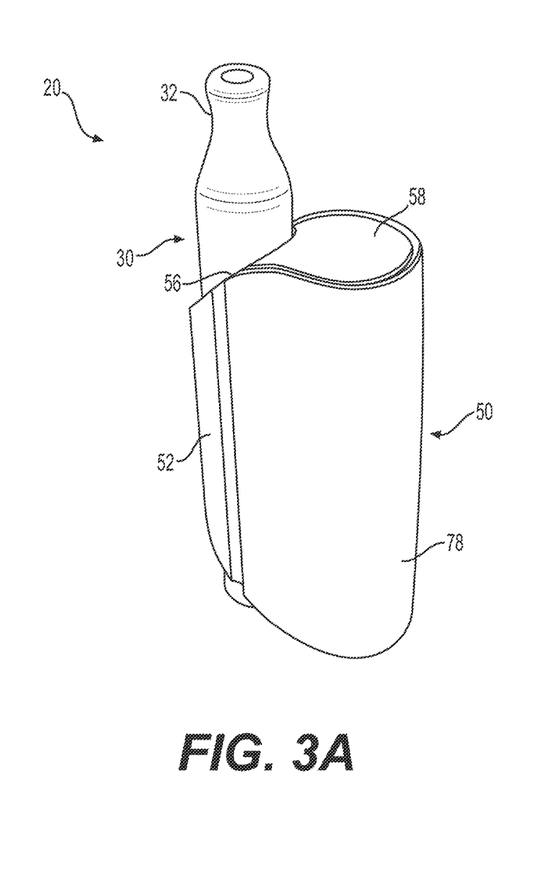
FIGS. 3A and 3B illustrate various views of a vaporizing device, consistent with an embodiment of the present application.
Figure 3B:
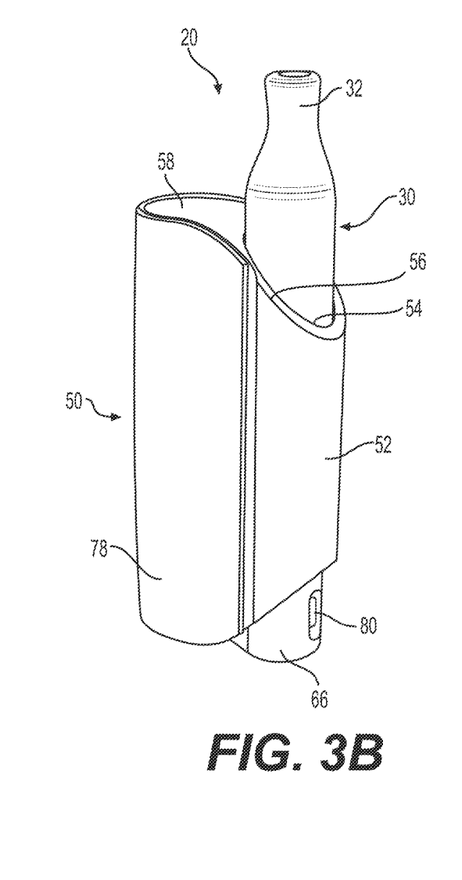

Referring first to FIG. 1, an embodiment of a vaporizing device 10 is shown, consistent with an embodiment of the present application. Devices according to the present application may include a tank 30 and a power component 50, e.g., battery component. The tank 30 may be configured to fit within a slot 54 of the power component 50 such that at least a portion of the tank 30 is adjacent to the power component 50 (see, e.g., FIG. 1). The power component 50 may have a generally ergonomic shape for fitting in the palm of a user's hand (see, e.g., FIG. 2). The vaporizing device 10 may have dimensions that allow a user to carry the device in a pocket of a piece of clothing.

Figure 8:
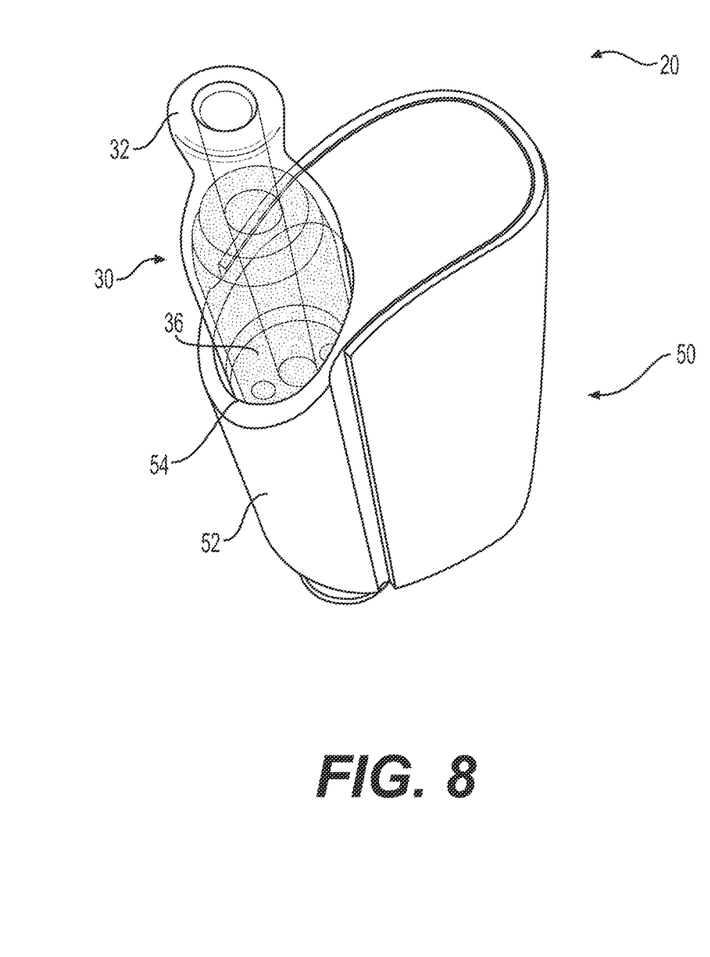
FIG. 8 is a top perspective view of the vaporizing device of FIGS. 3A and 3B.

FIGS. 3A, 3B, and 4-6 show different views of an exemplary vaporizing device 20 according to the present disclosure, which may be substantially similar to the vaporizing devices 10 shown FIGS. 1 and/or 2. As shown, the tank 30 may fit into a slot 54 of the power component 50 in an upright position. The dimensions and shape of the slot 54 may generally correspond to the dimensions of the tank 30, e.g., both the slot 54 and the tank 30 may be generally cylindrical in shape. When the tank 30 is secured in the slot 54, the power component 50 may provide power to an atomizer of the tank 30 to generate vapor. The mouthpiece 32 of the tank 30 may extend above the top surface 58 of the power component 50 for access by a user. While FIGS. 1 and 3A-3B each show the portion of the tank 30 within the respective slots 54 as entirely surrounded, in some embodiments the slot 54 of the power component 50 may only partially surround the tank 30, e.g., wherein the slot 54 has an opening along the side, such as a slit extending along the entire length or part of the length of the slot 54. At least a portion of the tank 30 may be at least partially or completely transparent to allow the user to view the liquid contents therein. In some embodiments, the slot 54 may be configured to allow a user to monitor the level of liquid in the tank 30. For example, the portion of the frame 52 that defines the top of the slot 54 may have a curved or tapered surface 56, such that the top of the slot 54 may be tapered to expose all or a portion of the length of the tank 30 (e.g., exposing all or a portion of a reservoir inside the tank, wherein the reservoir contains the liquid to be vaporized). In some embodiments, as shown in FIG. 8, for example, a portion of the tank 30 from the mouthpiece 32 to a middle or lower area 36 of the tank 30 may be visible when the tank 30 is disposed in the slot 54. The portion of the frame 52 that defines the slot 54 additionally or alternatively may be at least partially or completely transparent so that all or most of the tank 30 can be viewed. The tank 30 may be secured to (e.g., locked into) and electrically connected to the power component 50 by any suitable connection(s). For example, the power component 50 may include threads complementary to threads of the tank 30 for connecting the tank 30 to a battery or other power source within the power component 50. In some embodiments, the tank 30 may include a 510 threaded portion, a CE-4 type of threaded connection, or a CE-5 type of threaded connection, and the power component may include complementary threaded portions or types of threaded portions.

Figure 4:
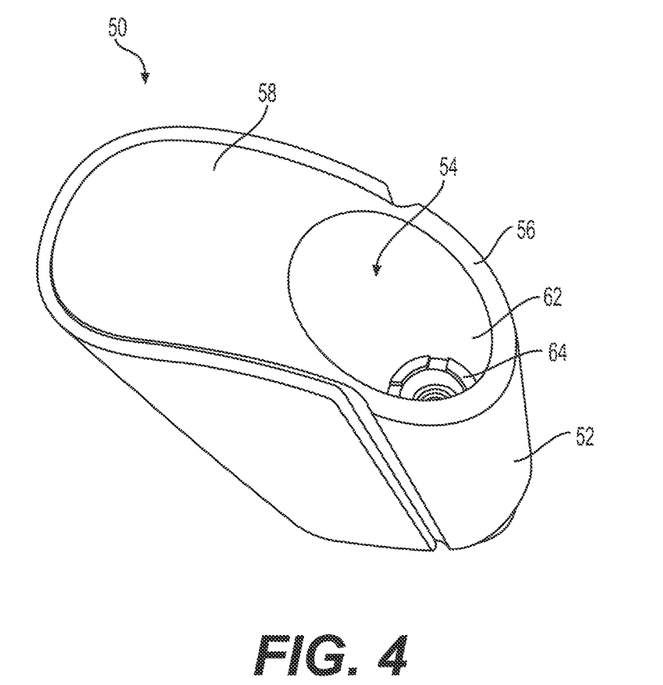
FIG. 4 is a top perspective view of a power component of the vaporizing device of FIGS. 3A and 3B, consistent with an embodiment of the present application.

In some embodiments, a bottom surface of the tank 30 may include a threaded portion that screws into the slot 54 of the power component 50. For example, the slot 54 of the power component 50 may have a closed bottom to limit displacement of the tank 30 in the slot 54. The wall 62 at the closed bottom of the slot 54 may include an electrical connector 64 to couple with a connector of the tank 30, e.g., for supplying power from the battery to the tank 30 (e.g., to the atomizer of the tank). FIG. 4 shows a top view of the power component of FIGS. 3A and 3B, wherein the bottom wall 62 of the slot includes a standard 510 threaded connector 64 for receiving a tank 30 with a complementary 510 threaded portion. In other embodiments, a side of the tank 30 may have threads complementary to threads in an adjacent surface of the power component 50. For example, the power component 50 may have a threaded portion along a side surface thereof.

Tanks suitable for the present disclosure include prefilled tanks and refillable tanks. Exemplary tanks may be about 13 mm or about 14 mm in diameter. In some embodiments, the vaporizer device 10 or 20 may include an adapter fixedly or detachably coupled to a surface of the slot 54 for connecting the tank 30 to the power component 50.

Figure 6:
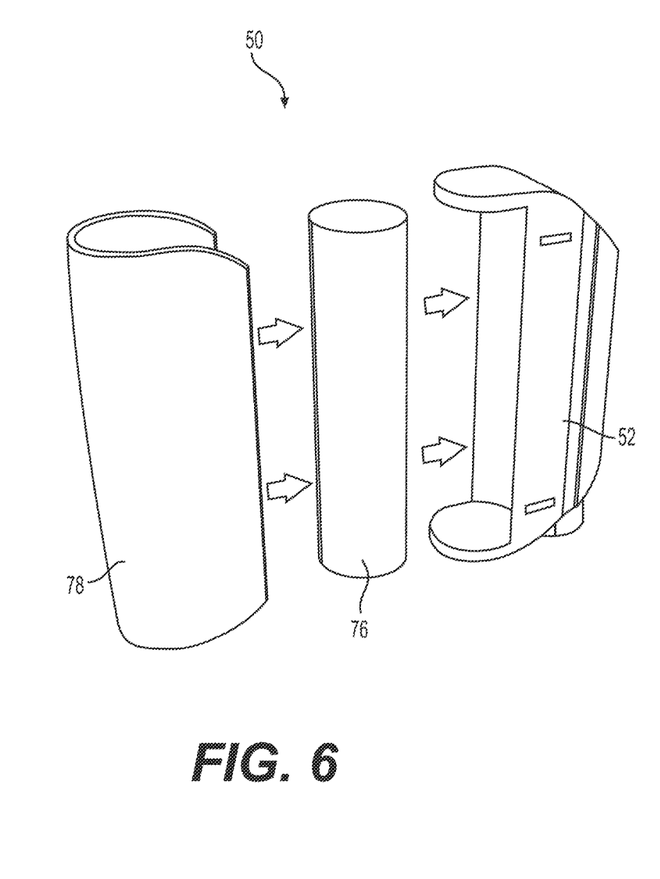
FIG. 6 is an exploded view of the power component of FIG. 4.
Figure 12:
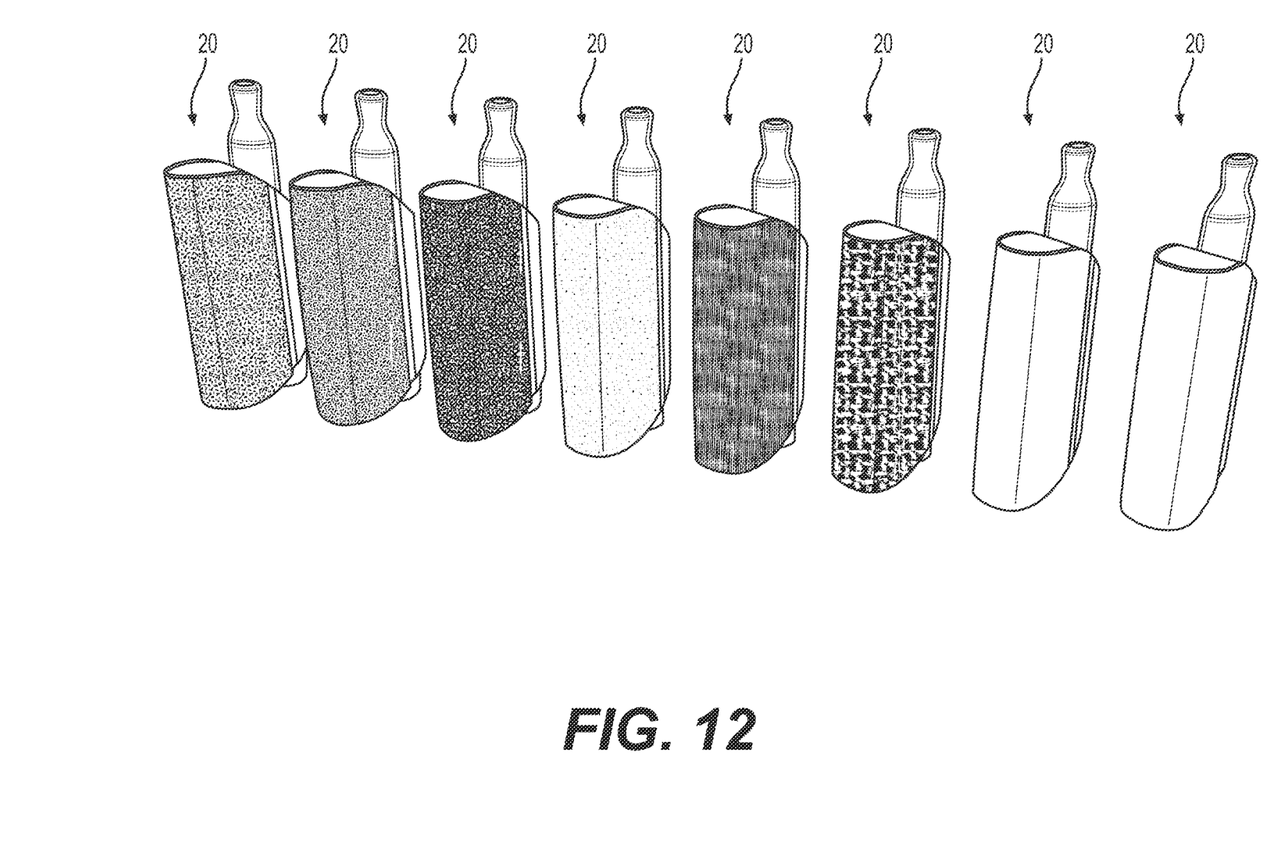
FIG. 12 illustrates a plurality of vaporizing devices, consistent with embodiments of the present application.

The power component 50 may include a battery 76 (as shown, for example, in FIG. 6), e.g., a rechargeable battery. In some embodiments, for example, the power component 50 may include a lithium-ion battery, e.g., a 1100 mAh or 2200 mAh Li-ion battery. FIG. 6 shows an exploded view of the power component 50 of FIGS. 3A and 3B, including a frame 52, a battery/battery cell 76 (hereinafter battery 76), and a cover or shroud 78 (hereinafter shroud 78). The battery 76 may be removable or non-removable. For example, the battery 76 may be fixedly attached to the frame 52 such that the battery 76 may not be removed from the power component 50. In some embodiments, the frame 52 may completely surround the battery 76, e.g., such that a user may not be able to access the battery 76. The frame 52 may contain various electronic components of the device, such as e.g., microprocessors, LEDs, sensors, etc. The shroud 78 also may be removable or non-removable. For example, the shroud 78 may be fixedly attached to the battery 76 and/or frame 52. In some embodiments, the shroud 78 may be removable, e.g., allowing a user to exchange shrouds 78 of different colors or designs (see, e.g., FIG. 12 and discussion below).

In some embodiments, the battery 76 may provide a voltage ranging from about 1.5 V to about 5.0 V, such as about 3.7 V. In some embodiments, the battery 76 may have a 3.7 V output that may be increased to 4.2 V, e.g., with a booster circuit, providing 13.6 W. The vaporizer device 10 or 20 may be configured to power an atomizer in the tank 30 down to about 1.0Ω.

The power component 50 may include a power button, e.g., for activating the battery. For example, the frame 52 may include a power button operably coupled to the battery 76, such that pressing the power button causes the battery 76 to supply voltage for vaporizing liquid in the tank 30, e.g., via a heating element in an atomizer of the tank 30. Additionally or alternatively, the power component 50 may be configured such that pressing one or more portions of the shroud 78 radially inward activates the battery 76 (e.g., similar to clicking a computer mouse). Thus, for example, a user may squeeze one or both sides of the shroud 78 while holding the vaporizing device 10 or 20 in his/her hand in order to generate vapor.

Figure 5:
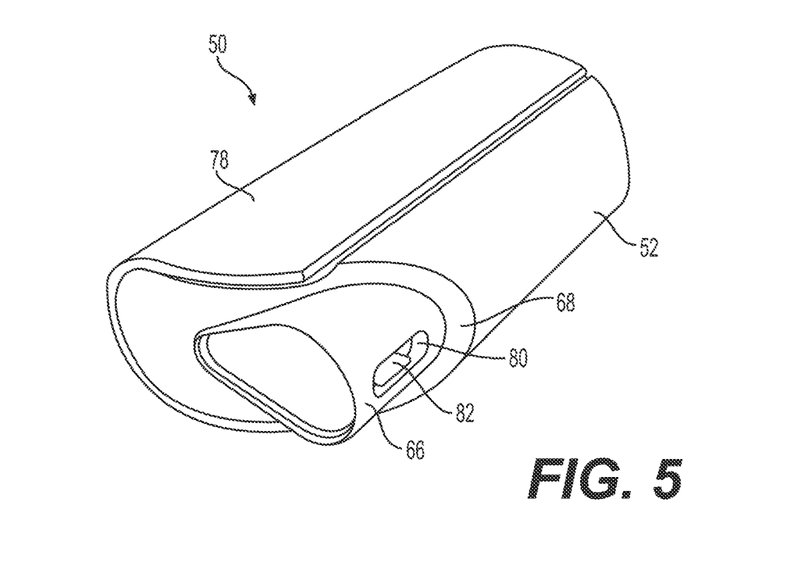
FIG. 5 is a bottom perspective view of the power component of FIG. 4.
Figure 9:
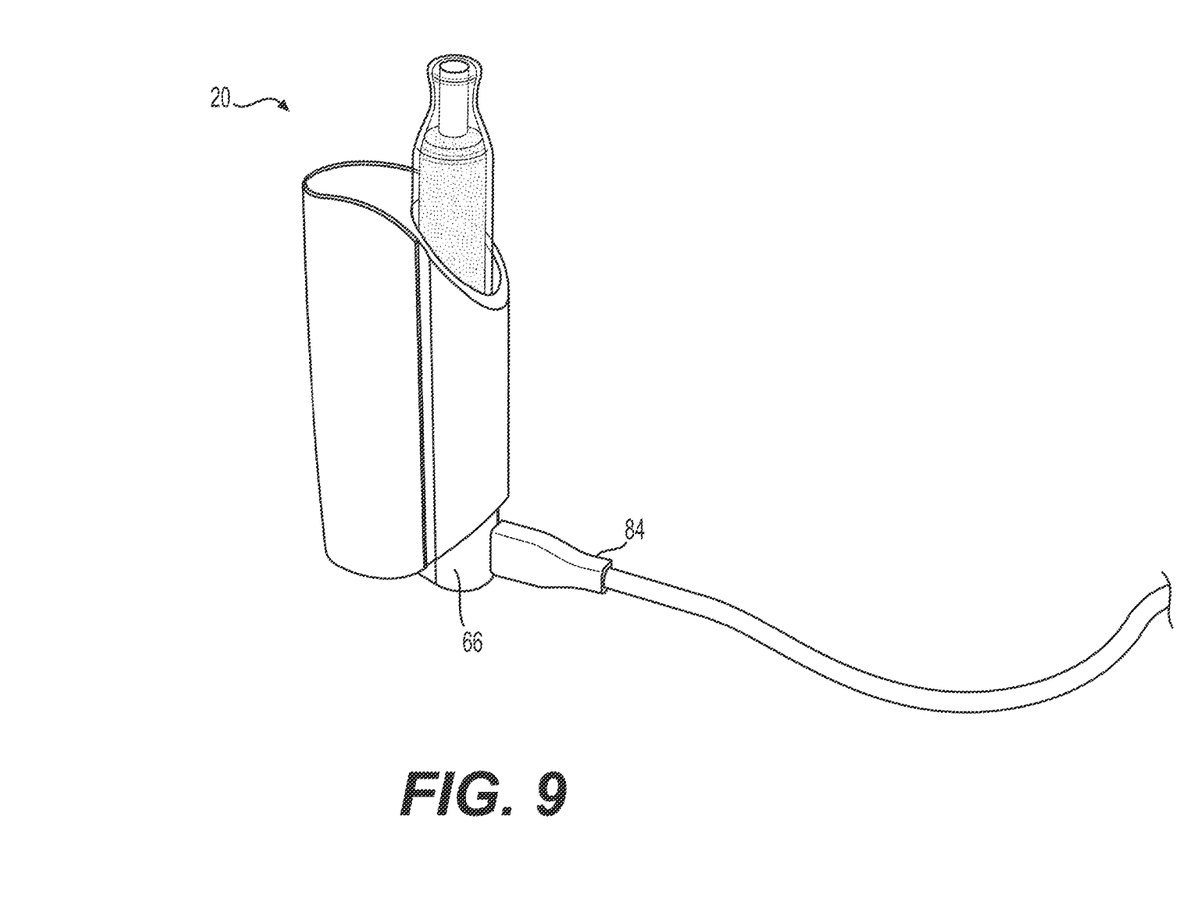
FIG. 9 is a perspective view of the vaporizing device of FIGS. 3A and 3B, illustrating a micro-USB cable connected thereto, consistent with an embodiment of the present application.
Figures 10A, 10B:
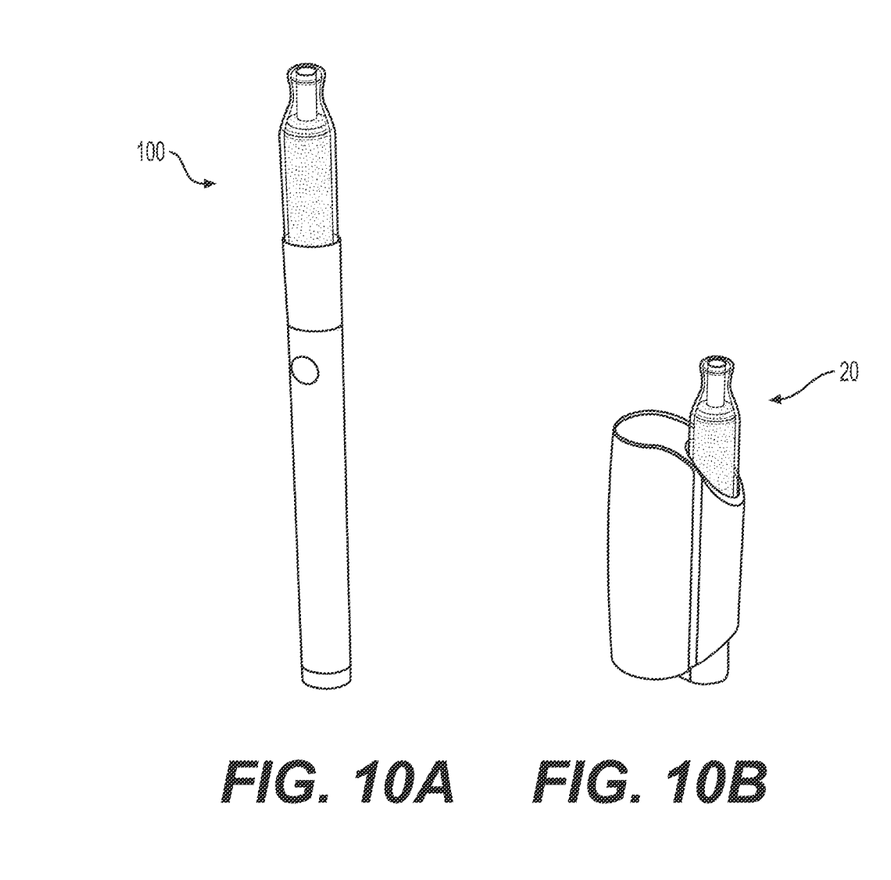
FIG. 10A is a perspective view of a prior art vape pen.
FIG. 10B is a perspective view of the vaporizing device of FIGS. 3A and 3B.

In some embodiments, the power component 50 may include a port 80 for connection to an external power supply for recharging the battery 76. For example, the power component 50 may include a USB or micro-USB charging port 80, e.g., as shown in FIG. 5. The port 80 may have any suitable location along the power component 50, such as, e.g., the bottom surface 68, the top surface 58, the side surface (opposite the slot 54 for receiving the tank 30), the front surface, or the back surface. FIG. 5 shows a bottom view of the power component 50 of FIGS. 3A and 3B, wherein a base portion 66 of the power component 50, below the slot 54 for the tank 30, includes a micro-USB connector 82. A micro-USB cable 84 may be connected to the connector 82, as shown in FIG. 9. The power component 50 may include multiple charging ports 80. Vaporizing devices 10 or 20 according to the present disclosure may be configured to stably sit on a desktop or other generally flat surface.

In some embodiments, the power component 50 may include one or more LEDs, e.g., as indicator lights. When the battery power is at or above a threshold level, the LED(s) may be one color (e.g., white), and when the battery power drops below the threshold, the LED(s) may change to a different color (e.g., red). The LEDs may be lit when the vaporizing device 10 or 20 is activated or may only be lit when the power component 50 is connected to a power supply (e.g., via a USB or micro-USB cord). Additionally or alternatively, the LEDs may be configured to flash. For example, the LEDs may briefly or continuously flash when the vaporizing device 10 or 20 is turned on or off. The base portion 66 of the power component 50 may be at least partially transparent to a user to see light from LEDs within (see, e.g., FIGS. 7C, 7D, 7E and 9).

Figure 11:
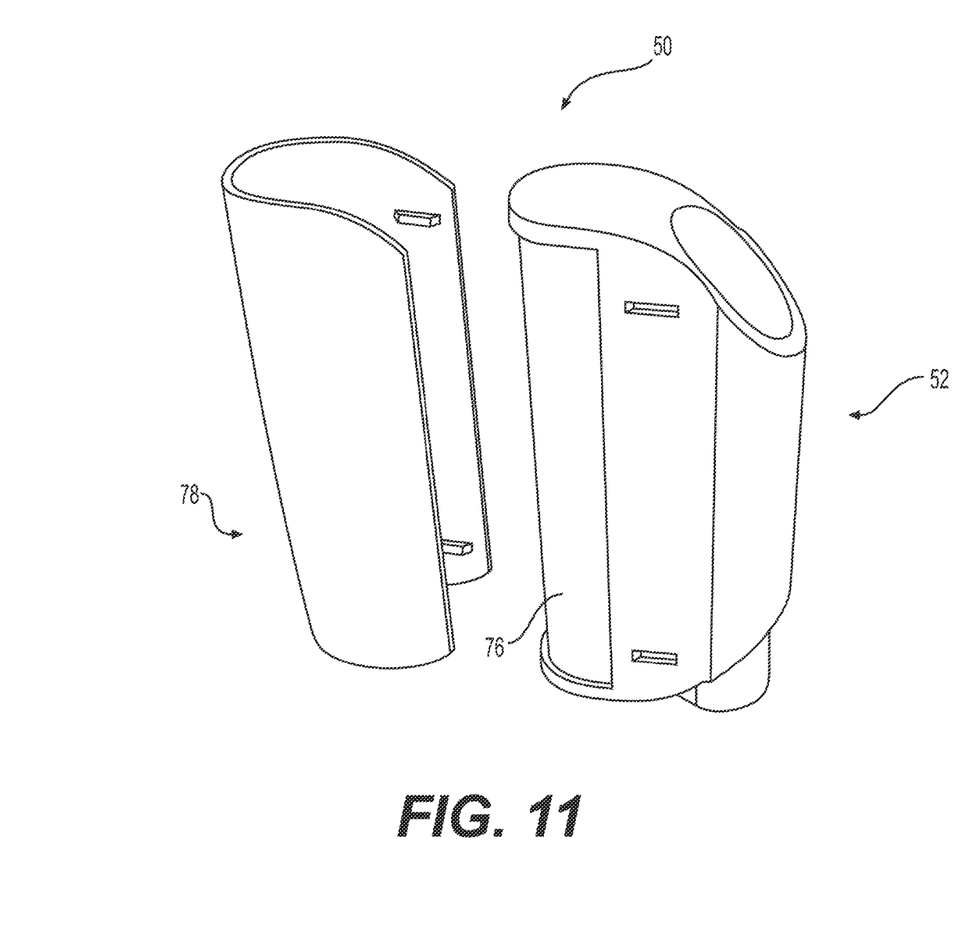
FIG. 11 is a side perspective view of the power component of FIG. 4, with a shroud thereof removed.

The power component 50 and/or tank 30 may be made of any suitable materials or combination of materials, including, but not limited to, glass, metal, plastics and other polymers and thermopolymers. As mentioned above, in some embodiments, the power component 50 may include a cover or shroud 78, which may be removable/replaceable from the power component 50 (as shown in FIG. 11). For example, the shroud 78 may be configured to snap onto the power component 50 (e.g., snap onto a frame 52 or housing of the power component 50), and may be removed by pulling the shroud 78 away from the power component 50. Any other suitable connections for securing the shroud 78 to the power component 50 may be used. The shroud 78 may allow for the power component 50 to have different colors and/or designs, according to the user's preferences.

Figure 7A:
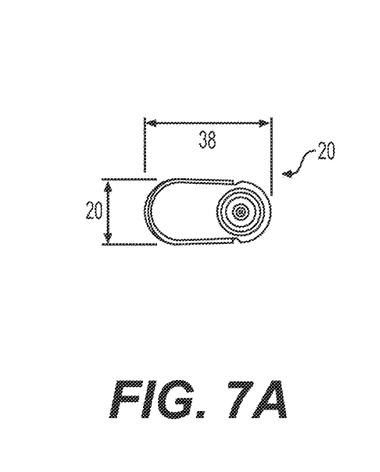
FIGS. 7A-7E illustrate various views of a vaporizing device and exemplary dimensions of a power component thereof, consistent with an embodiment of the present application.
Figure 7B:
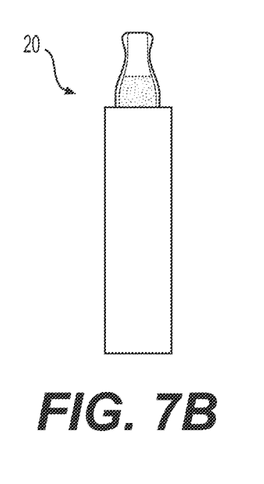
Figure 7C:
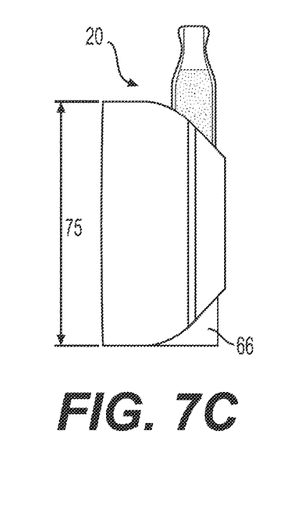
Figure 7D:
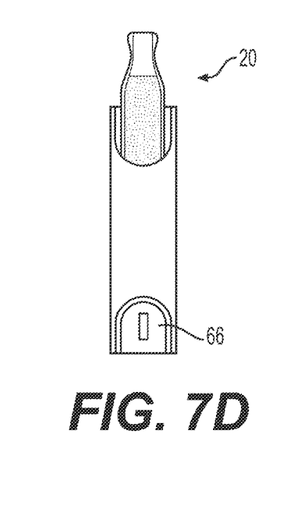
Figure 7E:
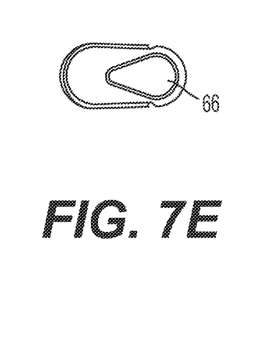

FIGS. 7A-7E and 8-12 illustrate additional features and characteristics encompassed by the present disclosure. FIGS. 7A and 7C, for example, shows exemplary dimensions of a power component 50 (75 mm+38 mm+20 mm). The power component 50 may have any other suitable dimensions. Referring to FIGS. 10A and 10B, a comparison of a wand-like vape pen 100 to a vaporizing device 20 of the present disclosure is shown, e.g., illustrating that embodiments of the present disclosure may have relatively more compact dimensions.

The following provides some exemplary features of power components 50 and vaporizing devices 10 or 20 according to the present disclosure. Power components 50 and vaporizing devices 10 or 20 according to the present disclosure may include at least one, some, or all of the features listed below. It is understood that additional embodiments and combinations of features are encompassed by the disclosure herein.

EXEMPLARY FEATURES 2,200 mAh Li-ion cell
Compact size, fits in the palm of your hand and is easily pocketable—no more wands
Micro-USB charging port—port is on the side so the unit can be recharged in the upright position
510 threads, accepts PFT and most CE-4 and CE-5 tanks
3.7 V output—could be increased to 4.2 V (with booster circuit) providing 13.6 W when used with a prefilled tank (PFT) (13 TPM)
Capable of powering atomizers down to 1.0Ω
Stable standing on your desktop
Replaceable cover—different colors are available (see, e.g., FIG. 11).

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims. All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vaporizing device comprising, in combination:
   a tank having a mouthpiece for insertion into a user's mouth, wherein the tank defines a reservoir therein, the reservoir configured to retain a liquid, and wherein at least a part of the tank is transparent to show the liquid; and
   a power component comprising:
      a frame, wherein a portion of the frame defines a slot configured to receive the tank in an upright position, wherein an upper portion of the frame that defines the slot has a tapered surface, such that a top of the slot is tapered to expose at least a portion of a length of the tank;
      a battery configured to be attached to the frame; and
      a shroud configured to be positioned around the battery and coupled to the frame;
   wherein at least a portion of the tank is adjacent to the power component when the tank is positioned in the slot.

2. The vaporizing device of claim 1, wherein the power component further comprises a charging port.

3. The vaporizing device of claim 2, wherein the charging port is positioned on a base portion of the power component.

4. The vaporizing device of claim 1, wherein a portion of the tank from the mouthpiece to a lower area of the tank is visible when the tank is disposed in the slot.

5. The vaporizing device of claim 1, wherein the power component further comprises an electrical connector positioned in the slot and configured to be connected to the tank.

6. The vaporizing device of claim 1, wherein the shroud is removably coupled to the frame.

7. The vaporizing device of claim 1, wherein the battery is removably attached to the frame.

8. The vaporizing device of claim 1, wherein the power component has a generally ergonomic shape configured to fit in a palm of the user's hand.

9. A vaporizing device comprising, in combination:
   a tank having a mouthpiece for insertion into a user's mouth, the tank comprising a reservoir configured to retain a liquid; and
   a power component comprising:
      a frame, wherein a portion of the frame having a tapered surface defines a slot configured to receive the tank in an upright position, wherein a top of the slot is tapered to expose at least a portion of a length of the tank;
      an electrical connector positioned in the slot and configured to be removably connected to the tank;
      a battery configured to be attached to the frame; and a shroud configured to be positioned around the battery and coupled to the frame;

wherein at least a portion of the tank is adjacent to the power component, and the liquid is visible when the tank is positioned in the slot.

10. The vaporizing device of claim 9, wherein the power component further comprises a charging port.

11. The vaporizing device of claim 10, wherein the charging port is positioned on a base portion of the power component.

12. The vaporizing device of claim 9, wherein a portion of the tank from the mouthpiece to a lower area of the tank is visible when the tank is disposed in the slot.

13. The vaporizing device of claim 9, wherein the shroud is removably coupled to the frame.

14. The vaporizing device of claim 9, wherein the battery is removably attached to the frame.

15. The vaporizing device of claim 9, wherein the power component has a generally ergonomic shape configured to fit in a palm of the user's hand.

16. A vaporizing device comprising, in combination:

a tank having a mouthpiece for insertion into a user's mouth; and a power component configured to fit in a palm of the user's hand comprising:

a frame, wherein an upper portion of the frame having a tapered surface defines a slot configured to receive the tank in an upright position of the frame and the tank, wherein a top of the slot is tapered to expose at least a portion of a length of the tank, and wherein a portion of the tank from the mouthpiece to a lower area of the tank is visible when the tank is disposed in the slot;

an electrical connector positioned in the slot and configured to be connected to the tank;

a base portion having a charging port;

a battery configured to be attached to the frame; and a shroud configured to be positioned around the battery and removably coupled to the frame;

wherein at least part of the tank is adjacent to the power component when the tank is positioned in the slot;

wherein the charging port is located on a sidewall of the base portion so that the battery may recharge in the upright position; and wherein the shroud has a U-shaped surface with an apex opposite the sidewall.

17. The vaporizing device of claim 16, wherein the charging port includes a micro-USB connector adapted to receive a micro-USB cable.

18. The vaporizing device of claim 16, wherein the electrical connector is a 510 threaded connector.

19. The vaporizing device of claim 16, wherein the tank contains a reservoir configured to retain a liquid, and part of the tank is transparent to view the liquid when the tank is in the slot.

* * * * *

UNITED STATES PATENT AND TRADEMARK OFFICE
CERTIFICATE OF CORRECTION

PATENT NO. : 10,251,425 B2  
APPLICATION NO. : 15/203334  
DATED : April 9, 2019  
INVENTOR(S) : David Schuler et al.

Page 1 of 1

It is certified that error appears in the above-identified patent and that said Letters Patent is hereby corrected as shown below:

On the Title Page

In the listing of inventors under item (72), "Jonathon Davenport" should be --Jonathan Davenport--.

Signed and Sealed this
Eighteenth Day of February, 2020

Andrei Iancu
*Director of the United States Patent and Trademark Office*